May 12, 1970  P. F. GAMBS  3,511,561
OPTICAL SYSTEM FOR OPHTHALMOMETERS PROVIDED WITH
STATIONARY SIGHTING MARKS
Filed Oct. 18, 1965
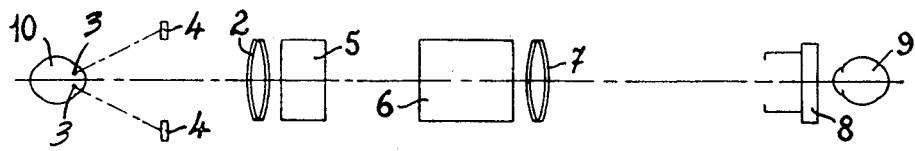
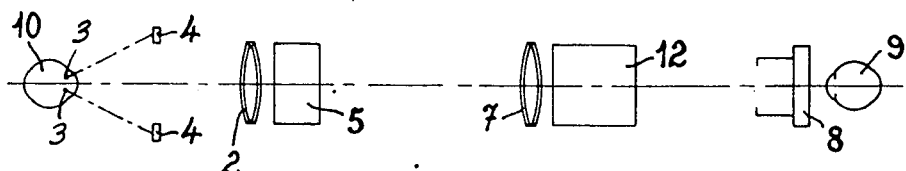
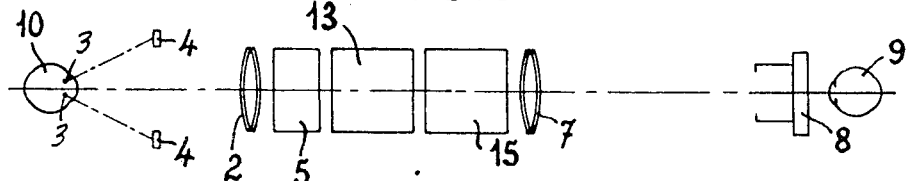
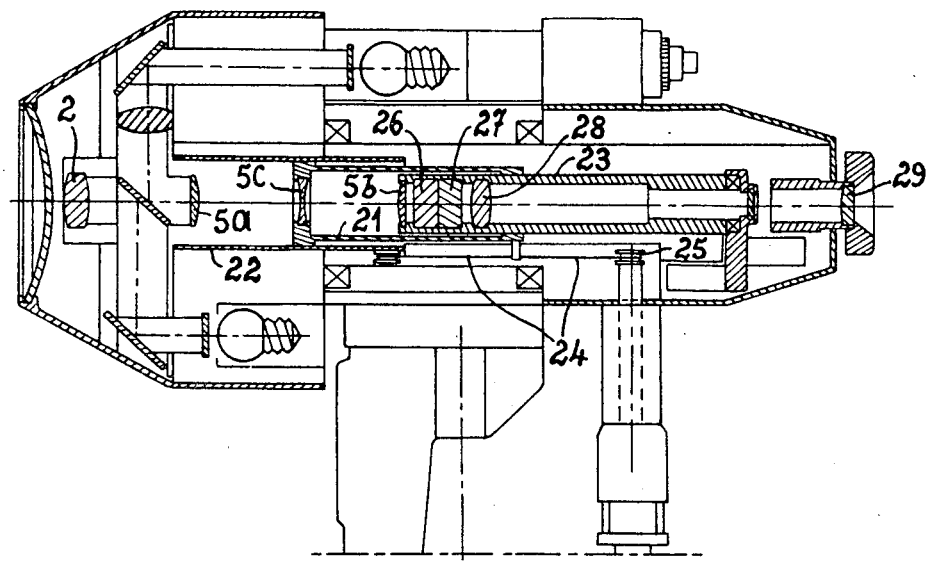
INVENTOR
PAUL FRÉDERIC MARIE GAMBS
BY Young & Thompson
ATTORNEYS

United States Patent Office 3,511,561
Patented May 12, 1970

3,511,561
OPTICAL SYSTEM FOR OPHTHALMOMETERS PROVIDED WITH STATIONARY SIGHTING MARKS
Paul Frédéric Marie Gambs, 140 Rue Mazenod, Lyon, Rhone, France
Filed Oct. 18, 1965, Ser. No. 504,281
Claims priority, application France, Jan. 26, 1965, 45,551
Int. Cl. A61b 3/10
U.S. Cl. 351—13    4 Claims

ABSTRACT OF THE DISCLOSURE

An ophthalmometer for the measurement of a patient's eye by a practitioner, comprises an optical system having stationary sighting marks and an unvarying duplicating system, and adjustable magnifying means disposed between the patient's eye and the duplicating system.

---

Ophthalmometers are generally subdivided into two types, to wit: (a) the ophthalmometers with unvarying duplicating means and movable marking sights, for instance ophthalmometers of the Javal type. Such ophthalmometers have the advantage of a low cost price, but lead to an antiquated structure of the instrument with unprotected slideways and racks which are consequently exposed to dirt, to premature wear and to deformation through shocks or stresses (b) the ophthalmometers having a stationary sighting mark with variable duplicating means as disclosed for instance in my U.S. Pat. No. 3,290,927, Dec. 13, 1966 and wherein all the movable parts are enclosed within a perfectly dusttight casing. Such ophthalmometers have thus a clean modern structure. However, the ophthalmometers of this last type are of a more delicate and costly construction than the former. One of the reasons for this is that the movable parts ensuring a modification in the duplication, for instance plates with planar parallel surfaces as illustrated at 6 and 11 in FIG. 1 of said patent, should be guided with an extreme accuracy during their movement failing which:

There is an error in the reading of the radius of curvature, said error being however of a limited importance at least in the embodiment described in the above-mentioned patent by reason of the slow action of the parallel surfaced plate.

There is an error in the reading of the astigmatism axis by reason of the shifting of the images of the sighting marks in a direction perpendicular to the duplication, because the position of the two images brought into coincidence is defined by two separate movable parts. This last defect may, for very slight deficiencies in the guiding of the movable elements, be highly objectionable as concerns the accuracy of the reading relating to said axes, chiefly in the case of slight astigmatism. The necessity of an extremely accurate guiding leads therefore to a comparatively expensive construction of the apparatus.

My improved optical system according to the present invention eliminates completely the second drawback mentioned hereinabove and provides an ophthalmometer with stationary sighting marks, which is of a particularly sturdy construction and is comparatively inexpensive.

Said novel optical system for ophthalmometers of the unvarying sighting mark type includes chiefly an arrangement with unvarying duplicating means and an optical system which is of revolution round the main optical axis and ensures a variable magnification provided by means inserted between the duplicating means and the patient's eye for which it is desired to measure the radius of curvature.

The above disclosure provides a short definition of the general operation of the system and of its advantages. This leads to a number of embodiments of which a number are described hereinafter by way of example in a non-limiting sense. Through the duplicating means, whether operating on a parallel or on a nonparallel beam, two optical directions located on the upstream side of the duplicating system correspond to the main optical axis of the eyepiece located on the downstream side of the duplicating system. In order that the images of the sighting marks may be seen by the operator in coincidence with each other on the main optical axis, it is necessary for them to be located on the two directions of the above-mentioned secondary optical axes, ahead of the duplicating means, that is between the duplicating system and the means adjusting the magnification to be provided.

The adjustable magnifying means have for their object to make said two secondary directions correspond with the two sighting lines on which are located the catadioptric cornealimages of the sighting marks obtained either directly or through the agency of a front objective. The modification in the magnification provided by the adjustable magnifying means has for its result an adjustment of this correspondence as a function of the spacing between the catadioptric images. Since the spacing between the catadioptric images is proportional to the radius of curvature of the cornea which is to be measured, it is immediately apparent that there exists a complete correspondence between the location of the movable parts of the optical system controlling the magnification and the radius of curvature measured, when the images of the sighting marks are seen in coincidence by the operator.

Said correspondence defines the manner of graduating the scale of the apparatus in radii of curvature of the cornea and, by the usual relationship between said radii and dioptres, it can also be graduated in dioptres. It is sufficient therefore to associate the reading scale with the movable parts of the adjustable magnifying means through any suitable arrangement. The optical system described has the following advantages: the duplicating means include no movable part and, as will be ascertained hereinafter, its construction is very simple and inexpensive. For the adjustment when assembling the instrument, it is sufficient to bring the directions of duplication into parallelism with the lines of the sighting marks, for instance by sighting on a graduated sphere. Now the adjustable magnitfying means include movable parts and cannot introduce any error due to a shifting of the axes since each part of said means acts simultaneously on the images of both sighting marks without distinguishing between the latter.

A defect in the guiding of the movable parts can therefore produce only the following drawbacks:

A radial defect through the eccentricity of the image system in the field, for which eccentricity the allowances are very large.

An axial defect produced by an error in reading, of radii or power, for which allowance is much larger than for the reading relating to the axes.

In all cases, it is an easy matter to suitably guide the lens-carrying barrels and to ensure a rigid connection or a constant compensation of the clearances between the said barrels and the small rule carrying the scales of radii of curvature and of dioptres.

Hereinafter, I will give a few examples of apparatus equipped with the improved optical system forming the object of my invention, but it seems unnecessary to completely describe and with any further detail the embodiments of the different elements of said system which may vary to a very considerable extent from one embodiment to the other. The duplicating system may be of the Helmholtz double plate type, of the Javal birefracting spartype, of the Landolt or Hartinger double prism type or again of a more compound type, for instance of the type described in my above-mentioned patent after eliminating the parallel surfaced plate 6 and 11.

The adjustable magnifying means may be selected from the numerous embodiments already known. It should first be remarked that, the requirements as to field, aperture and fixity of the focusing plane are much less stringent than for photographic or kinematographic applications to which most of the prior systems have generally been applied. Furthermore, the range of modifications which is practically required is limited to a ratio between 1 and 2, at least in a conventional ophthalmometer adapted to measure along its optical axis corneal radii of curvature ranging bewteen 5.5 and 11 mm.

Consequently, it is possible to select among the known adjustable magnifying means a very simple and cheap system without this affecting detrimentally the object of my invention.

Of course, the complete optical system of the ophthalmometer according to the present invention should be designed in a manner taking into account the technical rules in force, as shown by the following examples described in a non-limiting sense, reference being made to the accompanying drawings, the description of which is made in a direction leading from the patient's eye to the operator's eye. In said drawings:

FIG. 1 illustrates the application of the invention to an apparatus of the Javal type in which the duplicating system is inserted between two objectives;

FIG. 2 illustrates its application to the apparatus described in my above-mentioned prior patent, the duplicating system referred to being inserted between the objective and the eye-piece.

FIG. 3 shows the application of the invention to a Javal ophthalmometer, wherein the duplicating system inserted between two objectives is associated with two adjustable magnifying means.

FIG. 4 is a partial longitudinal cross-section of an ophthalmometer incorporating the optical system according to FIG. 1.

According to a first embodiment, my improved optical system for an ophthalmometer provided with stationary unvarying sighting marks includes, as shown in FIG. 1:

An objective 2 of which the object focus lies in a front plane extending inside the eye to be examined and in which are formed the catadioptric images on the cornea 3 of the sighting marks 4;

Afocal magnifying means 5 adapted to transform the angle within which said sighting marks are seen through the precedingly mentioned objective 2 into a constant angle equal to the duplicating angle provided by the following optical element 6. The movable elements of said adjustable magnifying means 5 are mechanically connected with a reading scale graduated in corneal radii of curvature and in dioptric powers. However, the reading arrangement described in my copending application Ser. No. 497,782, filed Oct. 19, 1965, which arrangement includes unvarying sighting marks, eliminates the use of such a mechanical connection;

An angle duplicating system 6 providing a constant effect, such as a double prism, as proposed by Landolt or Hartinger, a birefracting Dove or Wollaston spar prism as proposed by Javal or the like;

An objective 7 of which the image focus lies in the focal object plane of the eye-piece 8;

An eye-piece 8 for the operator at 9.

In its application to an ophthalmometer such as that illustrated in FIG. 4, there are furthermore provided:

A focal adjustable magnifying means including two identical stationary convergent lenses 5a and 5b and a movable divergent lens 5c which is rigid with a tube 21 sliding inside a stationary sleeve 22 and over a stationary sleeve 23 under the action of a cable 24 driven by the wheel 25;

A duplicating system such as that shown at 6 in FIG. 1 is constituted by a Dove or Wollaston prism formed by two half prisms 26 and 27 made of calcite and glued together. The outer surface of the complete prism are parallel and the glued surfaces slope at an angle of about 5° while the crystalline axes cross each other perpendicularly;

An objective which corresponds to the objective 7 of FIG. 1 and which is shown again at 28 is identical with the objective 2; the eye-piece 8 of FIG. 1 is shown again 29.

In a second embodiment, illustrated in FIG. 2, my improved arrangement includes:

An objective 2 of which the object focus lies in the front plane containing the corneal catadioptric images 3 of the sighting marks 4;

Afocal adjustable magnifying means 5 adapted to transform the angle within which said sighting marks 4 are seen through the preceding objective 2 into a constant angle, said constant angle corresponding to the duplication angle produced by the combination of a second objective 7 with a parallel duplicating system 12 following said adjustable magnifying means, said duplication angle $\alpha$ being such that $\tan \alpha/2 = \epsilon 2f$, $\epsilon$ designating the constant linear duplication produced by the duplication system 12 and $f$ designating the focal distance of the objective 7.

The movable elements of said adjustable magnifying means are connected with the reading scale graduated in corneal radii of curvature and in dioptric powers, unless the reading system described in the above-mentioned copending specification is resorted to:

An objective 7 of which the image focus lies in the focal object plane of the eye-piece 8, taking into account the length of the optical path passing through the duplicating system 12;

A duplicating system 12 having a constant parallel effect which may be a double sloping plate of the Helmholtz type, a sloped plate with parallel surfaces made of birefracting material or a system of prisms such as that described in my above-mentioned prior patent after eliminating the parallel surfaced plates 6 and 11 thereof or again a system or prisms such as that described in my above-identified patent, after eliminating the plates with parallel surfaces 55 and 61 thereof;

An eye-piece 8 for the operator.

Said optical system for ophthalmometers provided with unvarying sighting marks may furthermore comprise, as shown in FIG. 3:

An objective 2 of which the object focus lies in the front plane carrying the catadioptric corneal images 3 of the sighting marks 4;

Afocal adjustable magnifying means adapted to transform the angle within which said sighting marks are seen through said objective 2 into a constant angle equal to the duplication angle provided by the following element 13 constituted by an angle duplicating system; the movable elements of said adjustable magnifying means are connected with the reading scale graduated in radii of corneal curvature and in dioptric powers, unless the reading system described in my copending application already referred to is resorted to;

An angular duplicating system 13 having a constant effect such as a double prism of the Landolt or Hartinger type, a birefracting Wollaston spar prism as roposed by Javal or any other type of duplicating means;

Further afocal adjustable magnifying means 15 identical with or similar to the first adjustable magnifying means 5 but facing the opposite direction. The movable elements of these adjustable magnifying means are coupled so as to move simultaneously, each by the same amount, in opposite directions, so that the total magnification obtained remains at least approximately constant;

An objective 7 of which the image focus lies in the plane containing the object focus of the eye-piece 8;

An eye-piece 8 for the operator at 9.

It should be remarked that in the embodiment illustrated in FIGS. 1 and 2, the magnification for the operator's eye is inversely proportional to the radius of curvature which has been measured and since the catadioptric images of the sighting marks on the cornea have a size proportional to the radii of curvature, they appear thus always under the same angle at the moment of the measurement. In contradistinction, in the case illustrated in FIG. 3, the field observed remains constant.

What I claim is:

1. In an ophthalmometer for the examination of a patient's eye by a practitioner, the combination with stationary sighting marks of an optical system comprising an objective the object focus of which lies in the frontal plane carrying the catadioptric images formed on the cornea of the patient's eye, a further objective facing the practitioner's eye, an eye-piece inserted between the further objective and the location of the practitioner's eye and the focal object plane of which passes through the image focus of said further objective, an unvarying angle duplicating system inserted between the two objectives, and adjustable afocal magnifying means inserted coaxially with the objective between the first-mentioned objective and said duplicating system.

2. In an ophthalmometer for the examination of a patient's eye by a practitioner, the combination with stationary sighting marks of an optical system comprising an objective the object focus of which lies in the frontal plane carrying the catadioptric images formed on the cornea of the patient's eye, a further objective facing the practitioner's eye, an eye-piece inserted between the further objective and the location of the practitioner's eye, and the focal object plane of which passes through the image focus of said further objective, an unvarying parallel duplicating system inserted between the further objective and the eye-piece, and adjustable afocal magnifying means inserted coaxially with the objectives between the latter.

3. In an ophthalmometer for the examination of a patient's eye by a practitioner, the combination with stationary sighting marks of an optical system comprising an objective the object focus of which lies in the frontal plane carrying the catadioptric images formed on the cornea of the patient's eye, a further objective facing the practitioner's eye, an eye-piece inserted between the further objective and the location of the practitioner's eye and the focal object plane of which passes through the image focus of said further objective, an unvarying angle duplicating system inserted between the two objectives, adjustable afocal magnifying means inserted coaxially with the objective between the first-mentioned objective and said duplicating system, further adjustable afocal magnifying means inserted between the duplicating system and the further-mentioned objective, and means coupling the two magnifying means for providing a substantially constant magnification through the whole optical system.

4. In an ophthalmometer for the examination of a patient's eye by a practitioner, comprising an optical system having stationary sighting marks and a stationary duplicating system; the improvement comprising adjustable magnifying means disposed between the patient's eye and the duplicating system to modify the apparent distance of the catadioptric images.

References Cited

UNITED STATES PATENTS

| | | | |
|---|---|---|---|
| 1,721,208 | 7/1929 | Currier et al. | |
| 2,078,586 | 4/1937 | Richter | 350—184 |
| 2,107,305 | 2/1938 | Ogle. | |
| 2,179,850 | 11/1939 | Glancy | 350—184 |
| 1,750,931 | 3/1930 | Kellner et al | 351—10 |
| 1,918,540 | 7/1933 | Hartinger | 351—13 |
| 2,733,634 | 2/1956 | Littmann et al. | 351—10 |

DAVID SCHONBERG, Primary Examiner

P. A. SACHER, Assistant Examiner

U.S. Cl. X.R.

351—15